US012632030B1

(12) United States Patent
Stark et al.

(10) Patent No.: US 12,632,030 B1
(45) Date of Patent: May 19, 2026

(54) RELIABILITY, ALARMS, AND MAINTENANCE FOR BOREHOLE OPERATIONS

(71) Applicant: Halliburton Energy Services, Inc., Houston, TX (US)

(72) Inventors: Daniel Joshua Stark, Carrollton, TX (US); Adan H. Herrera, Carrollton, TX (US); Dion Billard, Houston, TX (US); Hunter Reid Faucher, Houston, TX (US); Adam Harold Martin, Carrollton, TX (US); Alexander Simon Chretien, Houston, TX (US); Dale E. Jamison, Houston, TX (US); Allan Silva Freitas, Macae (BR)

(73) Assignee: Halliburton Energy Services, Inc., Houston, TX (US)

( * ) Notice: Subject to any disclaimer, the term of this patent is extended or adjusted under 35 U.S.C. 154(b) by 741 days.

(21) Appl. No.: 18/091,332

(22) Filed: Dec. 29, 2022

(51) Int. Cl.
| | |
|---|---|
| *G05B 19/406* | (2006.01) |
| *E21B 41/00* | (2006.01) |
| *G05B 19/4063* | (2006.01) |
| *G06Q 10/0639* | (2023.01) |

(52) U.S. Cl.
CPC .......... *G05B 19/4063* (2013.01); *E21B 41/00* (2013.01); *G06Q 10/06395* (2013.01); *G05B 2219/31437* (2013.01)

(58) Field of Classification Search
None
See application file for complete search history.

(56) References Cited

U.S. PATENT DOCUMENTS

| | | | |
|---|---|---|---|
| 6,606,480 | B1 | 8/2003 | L'Allier et al. |
| 9,410,418 | B2 * | 8/2016 | Papouras ................ E21B 47/00 |
| 10,030,499 | B2 | 7/2018 | Johnston |
| 10,664,135 | B2 | 5/2020 | Jayabal et al. |

(Continued)

FOREIGN PATENT DOCUMENTS

| | | |
|---|---|---|
| EP | 1428976 A2 | 6/2004 |

OTHER PUBLICATIONS

"Modern HMIs: The Bakbone of Your Smart Connected Factory," Automation World, 21 pgs.

*Primary Examiner* — Howard Cortes
(74) *Attorney, Agent, or Firm* — John Wustenberg; Parker Justiss, P.C.

(57) ABSTRACT

A user can define an evaluation algorithm at a borehole system using sensor parameters collected at one or more locations throughout the borehole and equipment used at the borehole. The evaluation algorithm can implement statistical analysis on the parameters collected. The evaluation algorithm can combine two or more parameters to generate complex parameter relationships. The evaluation algorithm can implement one or more alarms using the analysis of the parameters. The alarms can specify levels or thresholds for different types or severities of alarms. Alerts can be defined using the alarms where the alerts are communicated to users or borehole systems for action. The evaluation algorithms can be packaged and forwarded for a technical review and a business management review, where evaluation algorithms that are approved can be made available to other users or at other borehole systems. Evaluation algorithms can be made available to select borehole systems or borehole operations.

23 Claims, 7 Drawing Sheets

(56)      References Cited

U.S. PATENT DOCUMENTS

| | | | |
|---|---|---|---|
| 10,928,786 B2 | 2/2021 | Dashevskiy et al. | |
| 11,047,221 B2 | 6/2021 | Abbassian et al. | |
| 11,242,742 B2 | 2/2022 | Andresen et al. | |
| 11,434,724 B2 | 9/2022 | Hidaka et al. | |
| 2002/0026592 A1 | 2/2002 | Gavrila et al. | |
| 2003/0174179 A1 | 9/2003 | Suermondt et al. | |
| 2004/0119754 A1 | 6/2004 | Bangalore et al. | |
| 2005/0246283 A1 | 11/2005 | Gwiazda et al. | |
| 2008/0243439 A1* | 10/2008 | Runkle | G08B 21/0476 |
| | | | 702/182 |
| 2018/0000346 A1* | 1/2018 | Cronin | A61B 5/00 |
| 2018/0298746 A1* | 10/2018 | Short | E21B 41/00 |
| 2020/0165910 A1 | 5/2020 | Andresen et al. | |
| 2020/0210824 A1* | 7/2020 | Poornaki | G06N 3/082 |
| 2022/0284366 A1* | 9/2022 | Kelly | B66C 13/18 |
| 2022/0313118 A1* | 10/2022 | Elhawary | G06F 18/00 |
| 2023/0020182 A1* | 1/2023 | Midkiff | H04N 23/661 |

* cited by examiner

RELIABILITY, ALARMS, AND MAINTENANCE FOR BOREHOLE OPERATIONS

TECHNICAL FIELD

This application is directed, in general, to analyzing borehole operations and, more specifically, to using an automated process to trigger alarms.

BACKGROUND

Operators and technicians on-site at a borehole system monitor various conditions of the borehole, fluid, and equipment used at the borehole system. Monitoring can include placing sensors downhole the borehole, at various surface locations, on or within equipment used at the borehole, or other sensors, such as satellite data or other sources. The parameters collected from these sensors can be used to monitor the various conditions used at the borehole system. The operators, technicians, or other types of users can build custom widgets (e.g., functions, processes, algorithms) to monitor the sensor data and define alarms using threshold parameters, and send out alerts using the alarms. It would be beneficial to provide a process for these custom widgets to be made available to users at other borehole systems.

SUMMARY

In one aspect, a method is disclosed. In one embodiment, the method includes (1) collecting sensor parameters from one or more sensors or data stores, wherein the sensor parameters are associated with an industry system, (2) defining an evaluation algorithm, wherein the evaluation algorithm provides a relationship between one or more sensor parameters and one or more threshold parameters, and a statistical analysis is applied to the sensor parameters, (3) determining one or more alarms or one or more alerts for the evaluation algorithm, and packaging the one or more alarms or the one or more alerts with the evaluation algorithm, (4) communicating the evaluation algorithm to a technical approval process, and (5) storing the evaluation algorithm in a data store when the evaluation algorithm is approved by the technical approval process.

In a second aspect, a system is disclosed. In one embodiment, the system includes (1) one or more sensors located proximate to an industry system, wherein the one or more sensors collect sensor parameters, (2) a data receiver, capable to receive the sensor parameters, input parameters, and one or more approved evaluation algorithms, (3) one or more processors, capable to communicate with the data receiver, and to provide an interface for a user to define an evaluation algorithm, and forward the evaluation algorithm to a technical approval process for a technical review, and (4) one or more data stores, capable of storing the evaluation algorithm as received from the one or more processors, and communicating with equipment at one or more industry system, wherein the evaluation algorithm is used at the one or more industry system.

In a third aspect, a computer program product having a series of operating instructions that directs a data processing apparatus when executed thereby to perform operations is disclosed. In one embodiment, the operations include (1) collecting sensor parameters from one or more sensors or data stores, wherein the sensor parameters are associated with an industry system, (2) defining an evaluation algorithm, wherein the evaluation algorithm provides a relationship between one or more sensor parameters and one or more threshold parameters, and a statistical analysis is applied to the sensor parameters, (3) determining one or more alarms or one or more alerts for the evaluation algorithm, and packaging the one or more alarms or the one or more alerts with the evaluation algorithm, (4) communicating the evaluation algorithm to a technical approval process, and (5) storing the evaluation algorithm in a data store when the evaluation algorithm is approved by the technical approval process.

BRIEF DESCRIPTION

Reference is now made to the following descriptions taken in conjunction with the accompanying drawings, in which.

DETAILED DESCRIPTION

Figure 1:
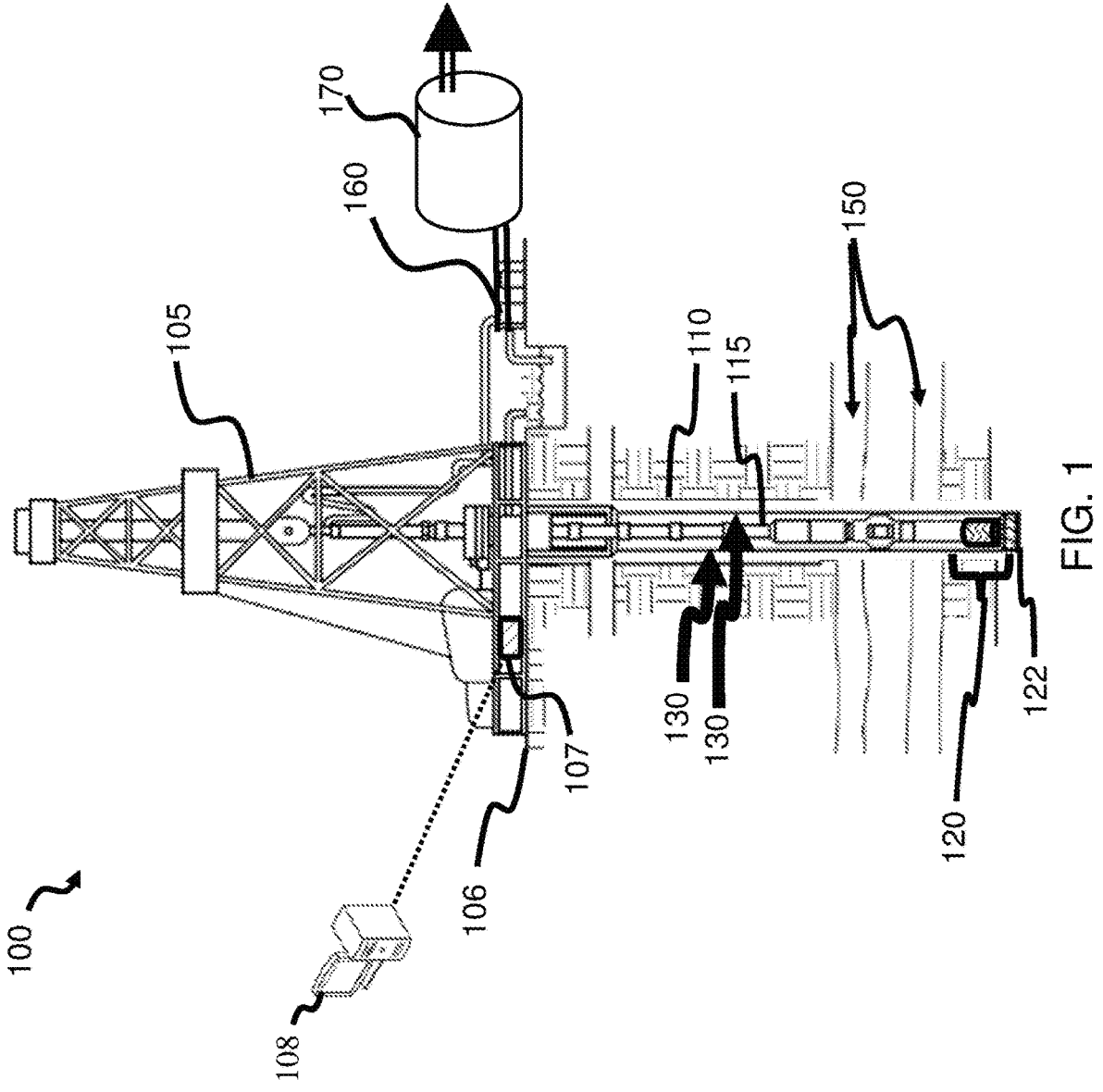
FIG. 1 is an illustration of a diagram of an example drilling system.

Developing a borehole, such as for scientific or hydrocarbon production purposes, can utilize data collected during borehole operations, such as drilling operations, for example, measuring while drilling (MWD), logging while drilling (LWD), seismic while drilling (SWD), and other types of drilling operations. Other borehole operations can be a completed borehole, production operations, production testing operations, interception operations, slickline or wireline operations, coiled tubing remediation, seismic profiling, and other types of borehole operations. The borehole operations can be to produce oil or gas products, or for scientific purposes, research, testing, or other non-hydrocarbon related purpose. These various borehole operations can be industry systems. Other industry systems can be, an equipment manufacturing site, a chemical processing plant, a chemical production plant, a solar farm installation, a wind farm installation, or other types of industry systems. In this disclosure, the term borehole system is used for demonstration and example purposes, while this disclosure can apply to one or more various types of industry systems.

Various types of sensors and tools can be utilized to collect the data, such as magnetic resonance sensors, resistivity sensors, acoustic sensors, nuclear sensors, temperature sensors, pressure sensors, seismic sensors, and other types of sensors. The data can be utilized by various borehole systems. For example, to adjust drilling parameters, to modify pumped borehole fluid, e.g., mud, adjust operations of a geo-steering system for a drilling assembly, or other uses by systems at the borehole.

Data collected from downhole sensors, tool sensors, or surface sensors can be used to analyze the current borehole operation. The analysis can be used to modify operations, alert systems for remediation actions, or trigger alarms for systems or users. The data can be collected and analyzed using algorithms that have been determined by a user or a borehole operation system.

This disclosure presents processes, e.g., methods and algorithms, that can be used to build, control, and distribute evaluation algorithms to one or more industry systems, such as borehole systems, (e.g., another borehole in the same reservoir as the first borehole, or a borehole in another reservoir area). The evaluation algorithms can be used to produce information that can be used as inputs into one or more industry systems, e.g., borehole operation systems. The evaluation algorithms can be used to trigger alarms when specified thresholds are crossed, such as being exceeded or falling below. There can be more than one threshold for a criteria, such as one level for a warning, one for a general alert, or one for a high level alert, or other threshold levels. The disclosure provides for a way for these evaluation algorithms to be verified and distributed to one or more industry system locations for use.

These processes can develop and distribute an evaluation algorithm that can be created by a user, such as an operator at a borehole, a user in a lab or corporate environment, or other types of users. The user can select one or more inputs from one or more sensors in and around the borehole from a display of the borehole system and equipment, and then can map the relationship between systems and equipment. This relationship can then use a variety of specified reliability and statistical metrics that can be implemented to confirm the reliability and precision of the intended measurement. Alarm and permission levels can also be set. The evaluation algorithm can be distributed to other users at the same borehole, a different borehole system, or a corporate location.

Implementation of these processes can achieve many benefits. Traditional reliability methods for surface equipment can require redundancy of sensors at the same sensing location to confirm the reliability of the accuracy of the measurement, often requiring three of the same sensor at a measurement point. These sensors can create additional costs of material, additional time in maintenance, more complicated skid designs, and larger or more packed skid designs. Rather than using so many sensors, sensors on different equipment can be matched for reliability instead of utilizing a sensor algorithm, such as 2 out of 3 voting. In some aspects, sensors can be of different types to improve sensitivity to different root cause errors. In some aspects, analysis and reliability evaluation algorithms can be packaged and deployed from a wide variety of sources creating a library of reference evaluation algorithms.

The evaluation algorithms can be packaged in a variety of ways. For example, a widget or microservice template can be used. The evaluation algorithms can be coded in one or more application languages, or can utilize application platforms to package and implement the evaluation algorithms.

In some aspects, sensor parameters can be collected from downhole, other surface locations, air-based, or space-based sensors. The processes can be used for analyzing electrical circuit diagrams, graphical programming systems, a process flow in a manufacturing plant, or other areas using a graphical display of flow of material or data.

In some aspects, uncertainty in the collected sensor parameters can cause uncertainty in the statistical analysis if the data population is too small for the measurement data's uncertainty to be recognized. Algorithms can be utilized to account for the uncertainty. For example, a minimum data set size can be used. Controls or statistical warnings can be deactivated until the uncertainty is sufficiently low, e.g., satisfies an uncertainty threshold parameter.

In some aspects, a time parameter can be important. For example, if a system becomes fouled with residue then uncertainty from sensors measured initially can be different a few hours or days later. Data analytical models, reliability methodologies (e.g., Weibull analysis), and physical models can be used to adjust the control and alarm parameters shown during different stages of the job (part of the borehole operation plan), where the models can utilize historical perspectives (such as for how long and at what conditions).

In some aspects, the processes can use discretized sensor data (data bins) to monitor, record, or predict component or equipment failures of the equipment used for the borehole system.

For example, establishing an accurate equivalent (total) loading when provided the summation of component loading conditions. In this way, extrapolation error can be avoided when assuming an average load condition utilizing empirical or field failure data.

For example, the evaluation algorithm can equate component or equipment failure (under various loading conditions) by the amount of fluid volume passing through the equipment under different flow rates and pressure conditions. Since the equipment can be operated under various pressure and flow conditions, the concept of equivalency can be used to adjust each volume per failure back to an equivalent volume, or volume per replacement (failure). Using empirical or field failure data, each equivalent volume (leading to one failure), could be forced to equate to other field failures (under different loading conditions) using matrix manipulation (e.g., multiplication) for comparison.

The goal can be to equate the two by minimizing the equivalency error, such as managed through a volume function. Statistical analysis can then be used to predict the reliability of each failure as a function of equivalent volume. The statistical analysis can provide for a fitting of a distribution onto the data rather than force-fitting the data to a preconceived distribution. The reliability of two or more components or pieces of equipment can be expressed in the functional form shown in Equation 1. For example, from Equation 1, the evaluation algorithm alarm can alert a user as to the useful life remaining of a piece of equipment utilizing the current dataset of fluid volume produced through the equipment. In some aspects, the alarm can produce a graphic (e.g., a visual representation). In some aspects, the alarm can produce a numeric representation (e.g., a table of values). In some aspects, the alarm can produce a combination. In each aspect, the alert generated from the alarm can communicate the information to a user or borehole system.

$$\text{Example function for the} \qquad\qquad\qquad \text{Equation 1}$$

$$\text{reliability of equipment } F(V; \alpha, \beta) = 1 - e^{-\left(\frac{V}{\alpha}\right)^{\beta}}$$

where V is the fluid volume flowing through the piece of equipment,

α is the shape parameter, as generally used in a Weibull analysis,

β is the characteristic life parameter, as generally used in a Weibull analysis.

In some aspects, the evaluation algorithms can generate one or more types of algorithmic calculations for the alarm outputs, such as utilizing the dataset quality or quantity. The calculation types can be a confidence level, a mean value, a minimum value, a maximum value, a median value, a variance, a skew (e.g., a Fisher's skew), a kurtosis (e.g., a Fisher's kurtosis), a moment, or other type of algorithmic calculation. A confidence interval can assist a user or system in interpreting the alarm and classify the potential risk that the alarm represents. The output (such as a visual graph, chart, or numeric table), the alarm, and the confidence level can define the reliability model.

Turning now to the figures, FIG. 1 is an illustration of a diagram of an example drilling system 100, for example, an LWD system, an MWD system, an SWD system, a telemetry while drilling (TWD) system, an injection well system, an extraction well system, and other borehole systems. Drilling system 100 includes a derrick 105, a well site controller 107, and a computing system 108. Well site controller 107 includes a processor and a memory and is configured to direct the operation of drilling system 100. Derrick 105 is located at a surface 106.

Extending below derrick 105 is a borehole 110 with downhole tools 120 at the end of a drill string 115. Downhole tools 120 can include various downhole tools, such as a formation tester or a BHA. At the bottom of downhole tools 120 is a drilling bit 122. Other components of downhole tools 120 can be present, such as a local power supply (e.g., generators, batteries, or capacitors), telemetry systems, sensors, transceivers, and control systems. Borehole 110 is surrounded by subterranean formation 150.

Well site controller 107 or computing system 108 (e.g., surface controllers) which can be communicatively coupled to well site controller 107, can be utilized to communicate with downhole tools 120 (e.g., downhole controllers), such as sending and receiving acoustic data, telemetry, data, instructions, subterranean formation measurements, and other information. Computing system 108 can be proximate to well site controller 107 or be a distance away, such as in a cloud environment, a data center, a lab, or a corporate office. Computing system 108 can be a laptop, smartphone, PDA, server, desktop computer, cloud computing system, other computing systems, or a combination thereof, that are operable to perform the processes described herein.

Well site operators, engineers, and other personnel can send and receive data, instructions, measurements, and other information by various conventional means, now known or later developed, with computing system 108 or well site controller 107. Well site controller 107 or computing system 108 can communicate with downhole tools 120 using conventional means, now known or later developed, to direct operations of downhole tools 120.

Casing 130 can act as a barrier between subterranean formation 150 and the fluids and material internal to borehole 110, as well as drill string 115. Surface equipment 160, and other surface equipment 170, represent the surface equipment and tools conventionally located at the surface of a borehole system. Sensors can be located with downhole tools 120, along borehole 110, at surface equipment 160, at other surface equipment 170, or at points between surface equipment, such as to monitor the pressure and temperature of the fluid flowing through the pipes. Data from one or more of these sensors can be communicated to the evaluation algorithm analyzer and used as inputs to the selected evaluation algorithms.

Users can define an evaluation algorithm or select an evaluation algorithm from a source, such as a library or database of evaluation algorithms that have been approved for use in the type of borehole and geology of the current borehole. An evaluation algorithm system can be used by the user to define or select an appropriate algorithm or algorithms to be used during borehole operations. The evaluation algorithms can define one or more alarms by specifying a threshold for one or more sensor parameters that would trigger an alert.

In some aspects, the evaluation algorithm analyzer can combine other data, such as the known composition of the subterranean formation being drilled through, or the composition of the drilling mud or other fluids pumped downhole. The composition of the drilling mud or pumped fluids can be received from other systems of the borehole, for example, a well site controller, a drilling planning system, or a pump system. The composition of the subterranean formation can be received from sensors located downhole, from survey data collected from this or proximate boreholes, or from other geological databases proximate or distant from the borehole.

In some aspects, the evaluation algorithm analyzer can communicate the alarm, the threshold used, and the triggering parameters to another system, such as computing system 108 or well site controller 107, where actions can be taken on the alarm. In some aspects, corrective action or preventive action can be scheduled for the borehole operation to reduce the risk as identified by the evaluation algorithm. In some aspects, computing system 108 can be the evaluation algorithm analyzer and can receive the sensor data. In some aspects, well site controller 107 can be the evaluation algorithm analyzer and can receive the sensor data. In some aspects, the evaluation algorithm analyzer can be partially included with well site controller 107 and partially located with computing system 108. In some aspects, the evaluation algorithm analyzer can be located in another system, for example, a data center, a lab, a corporate office, or another location.

Figure 2:
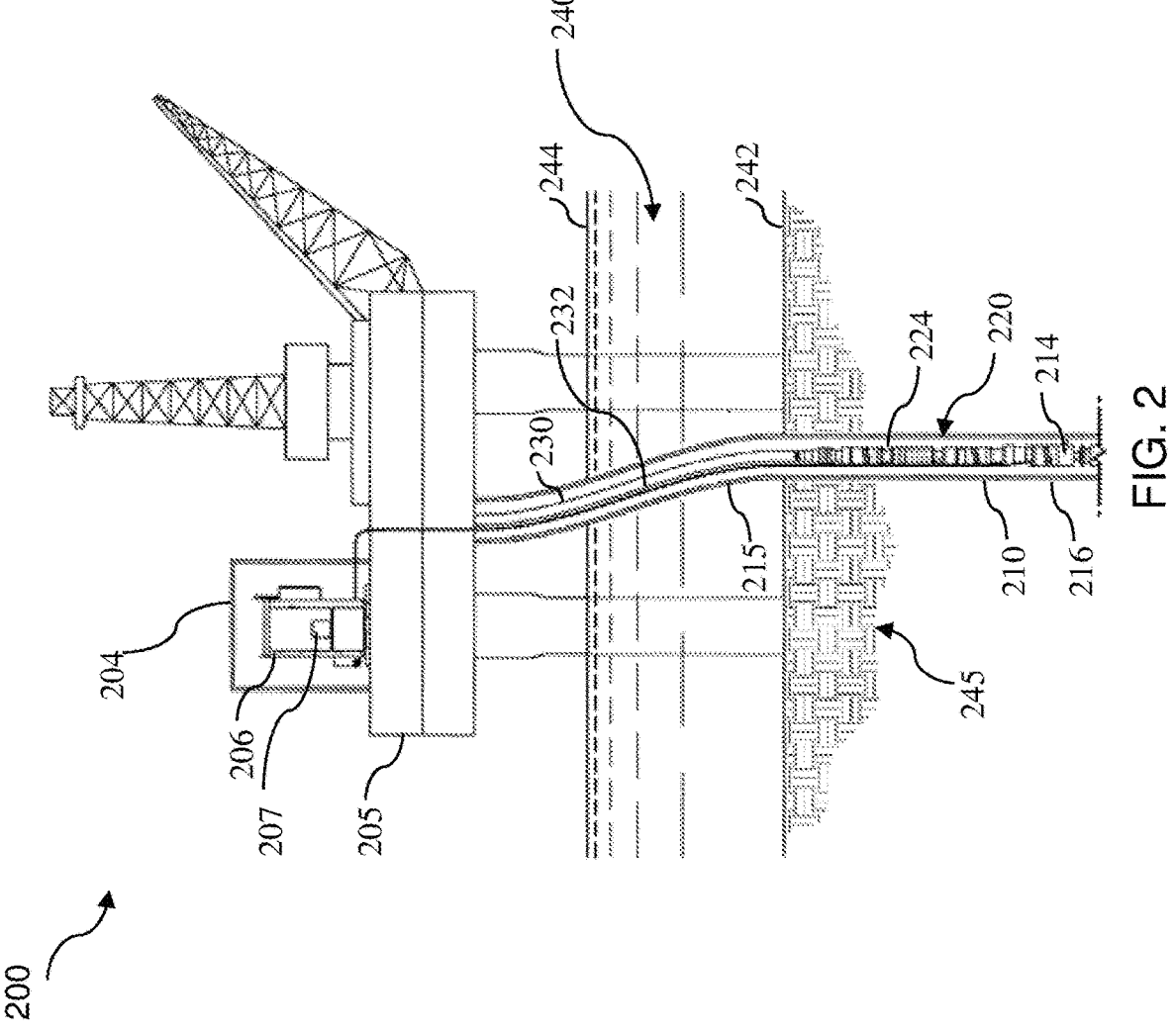
FIG. 2 is an illustration of a diagram of an example offshore system.

FIG. 2 is an illustration of a diagram of an example offshore system 200 with an electric submersible pump (ESP) assembly 220. ESP assembly 220 is placed downhole in a borehole 210 below a body of water 240, such as an ocean or sea. Borehole 210, protected by casing, screens, or other structures, is surrounded by subterranean formation 245. ESP assembly 220 can be used for onshore operations. ESP assembly 220 includes a well controller 207 (for example, to act as a speed and communications controller of ESP assembly 220), an ESP motor 214, and an ESP pump 224.

Well controller 207 is placed in a cabinet 206 inside a control room 204 on an offshore platform 205, such as an oil rig, above water surface 244. Well controller 207 is configured to adjust the operations of ESP motor 214 to improve well productivity. In the illustrated aspect, ESP motor 214 is a two-pole, three-phase squirrel cage induction motor that operates to turn ESP pump 224. ESP motor 214 is located near the bottom of ESP assembly 220, just above downhole sensors within borehole 210. A power/communication cable 230 extends from well controller 207 to ESP motor 214. A fluid pipe 232 fluidly couples equipment located on offshore platform 205 and ESP pump 224.

In some aspects, ESP pump 224 can be a horizontal surface pump, a progressive cavity pump, a subsurface compressor system, or an electric submersible progressive cavity pump. A motor seal section and intake section may extend between ESP motor 214 and ESP pump 224. A riser 215 separates ESP assembly 220 from water 240 until sub-surface 242 is encountered, and a casing 216 can separate borehole 210 from subterranean formation 245 at and below sub-surface 242. Perforations in casing 216 can allow the fluid of interest from subterranean formation 245 to enter borehole 210.

Sensors can be located with ESP assembly 220, along borehole 210, riser 215, equipment located on offshore platform 205, or at points between the various identified tools, such as to monitor the pressure and temperature of the fluid flowing through the pipes. Data from one or more of these sensors can be communicated to the evaluation algorithm analyzer and used as inputs to the selected evaluation algorithms.

Parameters (e.g., data) collected from the sensors can be communicated to the evaluation algorithm analyzer to produce results, such as alarms. The results can be communicated to one or more other systems, such as well controller 207. In some aspects, the sensor data can be transmitted to another system, such as well controller 207. Well controller 207 can be the evaluation algorithm analyzer or evaluation algorithm processor, or can be an evaluation algorithm controller. In some aspects, the evaluation algorithm analyzer or evaluation algorithm processor, or the evaluation algorithm controller, can be partially in well controller 207, partially in another computing system, or various combinations thereof.

The results of the evaluation algorithm analyzer, evaluation algorithm processor, or evaluation algorithm controller can be used to generate one or more alerts sent to one or more of a user or a borehole system. For example, an alarm can be specified on a temperature measured at a specified location. If the threshold for that temperature parameter is exceeded, then an alert can be communicated to a user or user group. An alert can be sent to a borehole system to take corrective action to lower the risk of a potential event.

FIG. 1 depicts onshore operations. Those skilled in the art will understand that the disclosure is equally well suited for use in offshore operations, such as shown in FIG. 2. FIGS. 1-2 depict specific borehole configurations, those skilled in the art will understand that the disclosure is equally well suited for use in boreholes having other orientations including vertical boreholes, horizontal boreholes, slanted boreholes, multilateral boreholes, and other borehole types. FIGS. 1-2 depict a drilling operation, those skilled in the art will understand that the disclosure can apply to drilling operations, production operations, intercept operations, relief well operations, completion operations, hydraulic fracturing operations, MWD operations, LWD operations, SWD operations, completed borehole operations, production testing operations, slickline or wireline operations, coiled tubing remediation, seismic profiling, and other types of borehole operations. The borehole operations can be to produce oil or gas products, or for scientific purposes, research, testing, or other non-hydrocarbon related purpose.

Figure 3:
FIG. 3 is an illustration of a diagram of example sensor collection points.

FIG. 3 is an illustration of a diagram of example sensor collection points 300. Sensor collection points 300 demonstrates a simplified surface equipment mapping of tools, equipment, and sensors. This mapping can be represented to a user, such as using a mapping tool or a graphical interface. In some aspects, a user can use this mapping to select the sensor parameters to be used as inputs into an evaluation algorithm that they are generating. In some aspects, a user can utilize a scripting tool to determine the input parameters used for the specified evaluation algorithm. In some aspects, a user can select an evaluation algorithm from a source, such as an approved database or library of evaluation algorithms. The user can then match up the available sensor points to the evaluation algorithm so the correct inputs are mapped to the algorithm.

Sensor collection points 300 is a graphical representation of a simplified oilfield surface equipment, where sensors are located proximate an industry system. A rig 310 is located at a surface of a borehole connecting rig 310 to an oil reservoir 312 below the surface. Sensors located downhole the borehole, such as located with downhole tools, can collect various parameters 315, for example, an oil flow rate, a gas flow rate, or a water flow rate. A surface pipe system can provide a fluid connection between rig 310 and a desander 330. The surface pipe system is shown as having an optional bypass of desander 330. Sensors located along the surface pipe system can collect parameters, such as sensors 320 and sensors 335 that are collecting fluid velocity, fluid pressure, and fluid temperature.

Desander 330 can have sensors associated with the equipment, collecting, for example, a change in pressure, a change in temperature, a C factor (representing internal smoothness or friction of the pipes used for the fluid flow), or a sand production parameter. A heat exchanger 340 can have sensors collecting, for example, a change in pressure or a duty parameter. Sensors 345 can be located along the pipe system and can collect parameters, such as pressure and temperature of the fluid flowing through the pipe system.

A separator 350 can have one or more sensors collecting parameters, for example, an oil flow rate, a water flow rate, a gas flow rate, a separation pressure, a separation temperature, an oil level, or a water level. Leading from separator 350 can be other pipe systems, such as a pipe system leading to pressure control valve 360. Sensors 365 can be located after pressure control valve 360 collecting parameters, for example, a maximum fluid velocity, a sonic fluid velocity, a fluid velocity, a fluid pressure, or a fluid temperature.

Another pipe system can lead to a level control valve 355. Sensors 357 located after level control valve 355 can collect parameters, for example, an erosion velocity, a fluid velocity, a fluid pressure, or a fluid temperature. In some aspects, other surface equipment can be present. In some aspects, other pipe systems and bypasses can be present. In some aspects, each of the sensors can collect one or more parameters. In some aspects, each of the sensors can collect more parameters than listed, the parameters listed are simplified for example and demonstration purposes.

Figure 4:
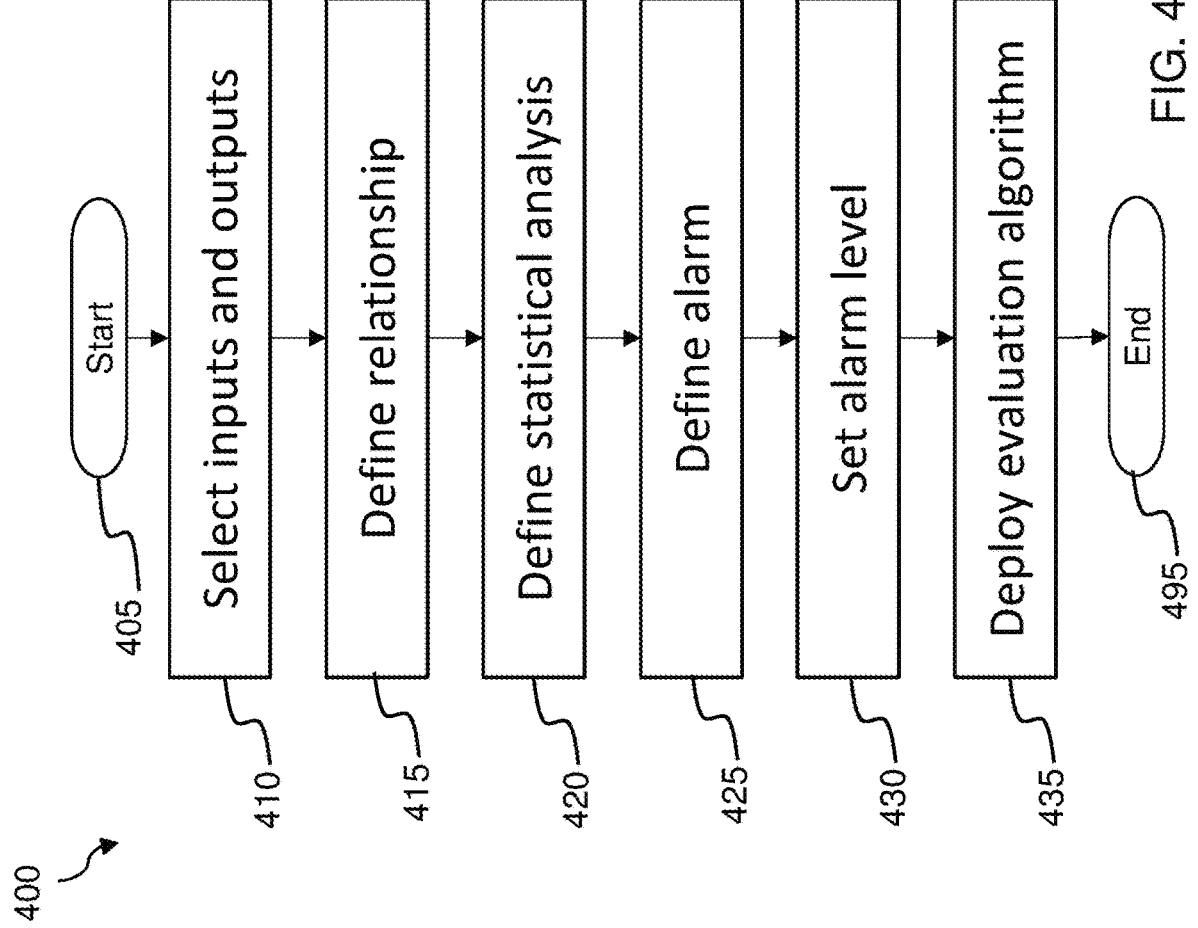
FIG. 4 is an illustration of a flow diagram of an example method to define an evaluation algorithm.

FIG. 4 is an illustration of a flow diagram of an example method 400 to define a evaluation algorithm, (e.g., a widget, a microservice, a function, a module, or other representation of the evaluation algorithm). Method 400 can be performed on a computing system, for example, evaluation algorithm analyzer system 600 of FIG. 6 or evaluation algorithm controller 700 of FIG. 7. The computing system can be a well site controller, a geo-steering system, a reservoir controller, a data center, a cloud environment, a server, a laptop, a mobile device, a smartphone, a PDA, or other computing system capable of receiving the acoustic data, input parameters, and capable of communicating with other computing systems. Method 400 can be encapsulated in software code or in hardware, for example, an application, code library, dynamic link library, module, function, RAM, ROM, and other software and hardware implementations. The software can be stored in a file, database, or other computing system storage mechanism. Method 400 can be partially implemented in software and partially in hardware. Method 400 can perform the steps for the described processes, for example, allowing a user to select one or more input parameters from a specified sensor or sensor location, allowing the user to define how the input parameters are utilized and defining one or more alarms using the input parameters.

Method 400 can define recorded sensor parameters as inputs and outputs to a function. Method 400 can define a relationship between the sensor parameters and meta-data (parameters, job details, and other borehole operations) of the system state. Method 400 can define a statistical analysis or a reliability method to apply to the relationship. Method 400 can define an alarm utilizing the analysis, and set an alert utilizing the alarm. Each of the process steps can consist of interactions, displays, and prompts with the user of a software system displaying the borehole system and the available sensor parameters.

Method 400 starts at a step 405 and proceeds to a step 410. In step 410, using one or more processors (such as an evaluation algorithm analyzer or an evaluation algorithm controller), a user can select one or more inputs from sensors located in a borehole, along the pipe system, attached to equipment either below the surface or at the surface, or sensors located proximate the borehole (for example, a seismic sensor located near the borehole). In some aspects, the one or more processors can be a well site controller, a borehole controller, a computing system, or other borehole system located proximate to the borehole or a distance away from the borehole. For example, the computing system can be in a lab, a corporate office, a data center, or a cloud environment. The process can utilize a graphical interface showing the available sensors, or the process can utilize a script, or other means for allowing the user to select the available sensor parameters from various locations along the borehole system.

In a step 415, a relationship can be defined using the one or more input parameters selected in step 410. The relationship can be the algorithm that will be used. In a step 420, additional analysis steps can be defined for the input parameters and the algorithm defined in step 415. For example, in some aspects, an algorithm can be defined as a temperature at location x should not exceed a threshold y. More complex scenarios can be defined using statistical analysis, such as a temperature at location z cannot exceed a threshold a while other parameters collected from a different sensor are within a specified range.

In a step 425, the relationships and analysis applied in the previous steps can be used to define an alarm or alarms. One or more threshold parameters can be used to indicate if an input parameter has exceeded or fallen below an acceptable range of values, if a valve is being opened or closed, or other parameter thresholds, for example, a temperature exceeding a high or low temperature. Using the input parameters, one or more alarms or alerts can be generated. Thresholds or criteria for the alarm can be set to trigger the alarm when certain conditions or combinations of conditions are met. In some aspects, there can be more than one threshold level, triggering a different alarm, for example, triggering a warning at a level, an elevated alert at a different level, or an emergency alarm at a third level. The generation of the alarm can encompass one or more sensors, one or more types of parameters, and the parameters can be received from one or more locations. For example, an alarm can be a temperature threshold at a specified location, or a combination of oil flow rate, pressure, and temperature at two specified locations.

In aspects, the alarm generation can be a step-by-step process, such as using popup windows, templates, pull-down menus, or other step-by-step processes. In some aspects, the alarm generation can be implemented using scripting tools, such as python, a graphic scripting tool, an automatic code generator (e.g., OpenAI's Codex), or other scripting tools or other implementation tools. The alarm generation can then be executed as an application, such as running in a system, shared via container, shared via JSON, shared as a microservice, or distributed in other conventional means.

In a step 430, in some aspects, the alarm defined in step 425 can be further combined with other alarms. In some aspects, an alert can be defined to be communicated if the alarm is triggered. In some aspects, the alert can be communicated to a user, a well site controller, a computing system, or to other borehole, systems. In some aspects, the alert can be used by a well site controller or other borehole system as an input into the borehole operation plan, for example, to modify the operation plan to mitigate a potential risk, such as to lower a borehole fluid pressure or to adjust additives added to a drilling mud, e.g., reduce a potential risk of an industry operation at the industry system.

In a step 435, the relationships, algorithms, statistical analysis, alarms, and alerts can be packaged as an evaluation algorithm. The evaluation algorithm can then be deployed, for example, at a borehole system, such as locally where the user is located. Method 400 ends at a step 495.

For example, a workflow can be defined to create an alarm to look for a drift in the oil/water ratio. The user can define sensor parameters that can be used for the input parameters. The flow rate, oil level, water level, and three pressures can be selected. The oil level and water level can be used for the output parameters, while the remaining parameters can be used as the input parameters. The two pressures ($P_0$ and $P_1$) can be used to confirm the accuracy of the pressure measurement entering the separator as the two pressures should be the same once a pressure drop due to the separation of pipe is taken into account. Another input to the model can be temperature ($T_1$ and $T_2$) from the inlet and outlet of the heat exchanger to estimate the separation of liquids and gases.

After selecting the inputs and outputs, the user can define a relationship between the variables. In some aspects, the user can define this analytically or statistically. In some aspects, the user can specify that the algorithm is calculated (such as with a physical model, a fitting routine, an operational parameter space, a machine learning-derived model, or other types of calculations) using either real-time or near real-time data from the sensors, historical data from the current borehole system, historical data from other borehole systems, historical data from lab tests, or various combinations thereof. In this example, the function provides the oil level/water level ratio as a function of the pressures and flow rate.

Given the defined relationship, the sensitivity of the parameters of the fit, the coefficients of the analytical equation, the variation of the data, or the comparison of the data to known references (such as a reliability model of the equipment and system using Weibull distributions and known alpha, beta, and gamma values of the equipment), can be determined using statistical methods, reliability methods, or data analysis methods to derive a figure of merit. In this example, a chi-squared test can be used. Once a relationship is developed, an alarm can be defined utilizing the relationship (such as a p-value<0.05). One or more threshold parameters can be associated with the alarm to determine one or more levels that the alarm can correspond to. The thresholds can define a range of values, the thresholds can define a warning level or a critical level, the thresholds can define the level of obtrusiveness of the subsequent alert, such as logging an event, an unobtrusive flashing, a flashing pop-up, an audible siren, a stop-work command sent to the equipment, or other types of alerts. The alerts can be communicated to a user or a borehole system, such as a well site controller or a borehole operation system.

Figure 5:
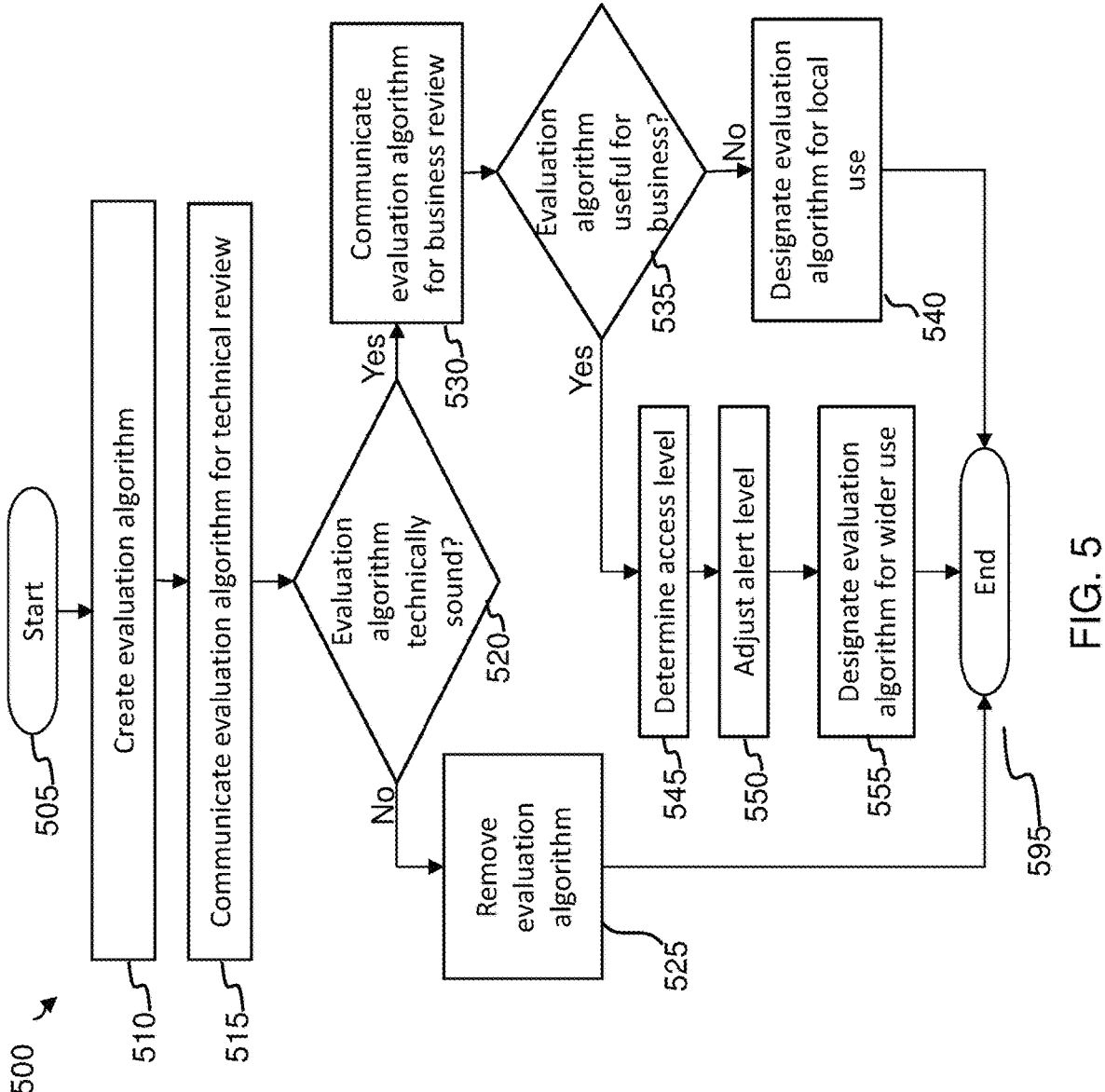
FIG. 5 is an illustration of a flow diagram of an example method to approve an evaluation algorithm.

FIG. 5 is an illustration of a flow diagram of an example method 500 to approve an evaluation algorithm. Method 500 can be performed on a computing system, for example, evaluation algorithm analyzer system 600 of FIG. 6 or evaluation algorithm controller 700 of FIG. 7. The computing system can be a well site controller, a geo-steering system, a reservoir controller, a data center, a cloud environment, a server, a laptop, a mobile device, a smartphone, a PDA, or other computing system capable of receiving the acoustic data, input parameters, and capable of communicating with other computing systems. Method 500 can be encapsulated in software code or in hardware, for example, an application, code library, dynamic link library, module, function, RAM, ROM, and other software and hardware implementations. The software can be stored in a file, database, or other computing system storage mechanism. Method 500 can be partially implemented in software and partially in hardware.

Method 500 can perform the steps for the described processes, for example, processing an evaluation algorithm through a technical and business review, and tagging the evaluation algorithm for local or broader use at a borehole operation. The evaluation algorithm can be evaluated and deployed globally, such as for jobs on similar equipment utilizing input from a technical approval process and a business approval process. The technical approval process can be by a subject matter expert (SME), a development operations (DevOps) pipeline, or other technical approval process. An evaluation algorithm created locally can be communicated to an SME for technical evaluation.

If the relationship and statistical method are determined to be sound, then the evaluation algorithm can be forwarded to a business approval process to set access levels and distribution levels for different types of users. In combination with input from the technical approval process, the business approval process can specify adjustments to the alarm levels. In some aspects, the business approval process can specify a user access level that can utilize the evaluation algorithm.

In some aspects, the review and approval process can be automated, such as using a development operations (DevOps) pipeline. In some aspects, the technical review can be automated before forwarding for a business review. In some aspects, the business review can be automated, such as using a machine learning model, a workflow, a regression based algorithm, or other types of business reviews. In some aspects, the technical review and the business review can be automated. The evaluation algorithm can be distributed and used by other operations. This process can be processed on using one or more processors, such as an evaluation algorithm analyzer or an evaluation algorithm controller.

Method 500 starts at a step 505 and proceeds to a step 510. In step 510, from method 400, the evaluation algorithm can be input into method 500. In some aspects, an evaluation algorithm can be automatically communicated from the system that defined the evaluation algorithm. In some aspects, a user can trigger a process to communicate the evaluation algorithm as an input to method 500.

In a step 515, the evaluation algorithm can be communicated to a process for SME review. SME review can occur within the same system, processor, or controller as the definition of the evaluation algorithm, or a different system, processor, or controller. For example, a user can utilize a well site controller to define the evaluation algorithm, and then it can be communicated to a data center where an SME can perform their processes.

In a decision step 520, the SME can determine whether the evaluation algorithm satisfies appropriate technical analysis, rules, or policies. If the resultant is a "Yes", then method 500 proceeds to a step 530. If the resultant is a "No", then method 500 proceeds to a step 525. In step 525, the evaluation algorithm is indicated as not passing the technical review and is disallowed from being used as part of the resource library or database of evaluation algorithms. The local user who defined the evaluation algorithm can continue to utilize the evaluation algorithm. Method 500 proceeds to a step 595 and ends.

In step 530, the evaluation algorithm can be communicated to a system for a business review. The business review can be the same system or a different system from the technical review or the evaluation algorithm definition. In a decision step 535, the business review can determine under what conditions or scenarios the evaluation algorithm could be useful. This can utilize equipment parameters (such as when a certain type of equipment is in use), geographical parameters (such as when a certain type of subterranean formation is encountered), business parameters (such as when preferred equipment is to be used or when business level risks are involved), safety parameters (such as when safety protocols dictate certain alarms or warnings), or other types of parameters. If the resultant is a "Yes", method 500 proceeds to a step 545. If the resultant is a "No", method 500 proceeds to a step 540. In step 540, the evaluation algorithm can be designated for use by the local user who defined the evaluation algorithm, and not designated for use by other users. Method 500 proceeds to step 595 and ends.

In step 545, a level access can be designated for the evaluation algorithm. For example, a level of access can be a specified group of users, a specified job or position, a type of borehole operation, a regional designation, a subterranean formation type, or other level of access types. In a step 550, the one or more alarms can be adjusted to fit a more generalized use case and the resulting alert types can be adjusted. In a step 555, the evaluation algorithm can be communicated to a database, data store, library, or other storage area and be made available to users or borehole operations that meet the criteria for use of the evaluation algorithm. The evaluation algorithm can be accessed, downloaded, or otherwise enabled for use by the borehole operation team. Method 500 proceeds to step 595 and ends.

Figure 6:
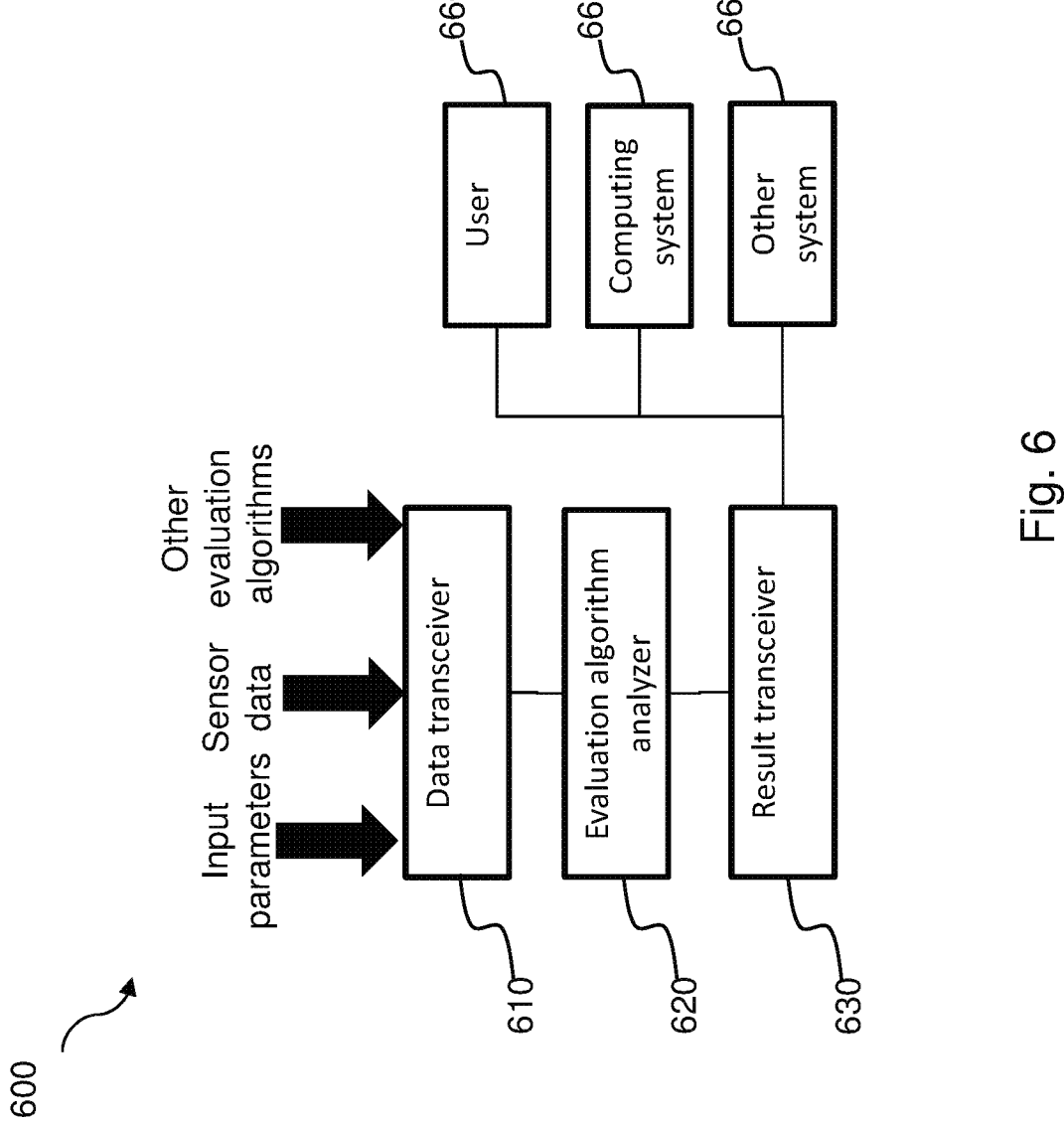
FIG. 6 is an illustration of a block diagram of an example acoustic data analyzer system.

FIG. 6 is an illustration of a block diagram of an example evaluation algorithm analyzer system 600, which can be implemented in one or more computing systems, for example, a data center, cloud environment, server, laptop, smartphone, tablet, and other computing systems. In some aspects, evaluation algorithm analyzer system 600 can be implemented using an evaluation algorithm controller such as evaluation algorithm controller 700 of FIG. 7. Evaluation algorithm analyzer system 600 can implement one or more methods of this disclosure, such as method 400 of FIG. 4 or method 500 of FIG. 5.

Evaluation algorithm analyzer system 600, or a portion thereof, can be implemented as an application, a code library, a dynamic link library, a function, a module, other software implementation, or combinations thereof. In some aspects, evaluation algorithm analyzer system 600 can be implemented in hardware, such as a ROM, a graphics processing unit, or other hardware implementation. In some aspects, evaluation algorithm analyzer system 600 can be implemented partially as a software application and partially as a hardware implementation. Evaluation algorithm analyzer system 600 is a functional view of the disclosed processes and an implementation can combine or separate the described functions in one or more software or hardware systems.

Evaluation algorithm analyzer system 600 includes a data transceiver 610, an evaluation algorithm analyzer 620, and a result transceiver 630. The results, e.g., the potential alarms, the evaluation algorithm, the analysis, and the interim outputs from evaluation algorithm analyzer 620 can be communicated to a data receiver, such as one or more of a user or user system 660, a computing system 662, or other processing or storage systems 664. The results can be used to define an evaluation algorithm that is available to other borehole systems or users, such as using a database, data store, or library. An execution of the evaluation algorithm at a borehole system can generate an output that can be used as inputs into a well site controller or other borehole system, such as a borehole operation system.

Data transceiver 610 can receive input parameters, such as parameters to direct the operation of the analysis implemented by evaluation algorithm analyzer 620, such as algorithms to utilize in determining the results, which transformations or filters to apply, or other input parameters. In some aspects, data transceiver 610 can be part of evaluation algorithm analyzer 620.

Result transceiver 630 can communicate one or more results, analysis, or interim outputs, to one or more data receivers, such as user or user system 660, computing system 662, storage system 664, e.g., a data store or database, or other related systems, whether located proximate result transceiver 630 or distant from result transceiver 630. Data transceiver 610, evaluation algorithm analyzer 620, and result transceiver 630 can be, or can include, conventional interfaces configured for transmitting and receiving data. In some aspects, evaluation algorithm analyzer 620 can be a machine learning system, such as applying learned analyzation models to the collected sensor parameters to improve the determination of whether an alarm should be triggered.

Figure 7:
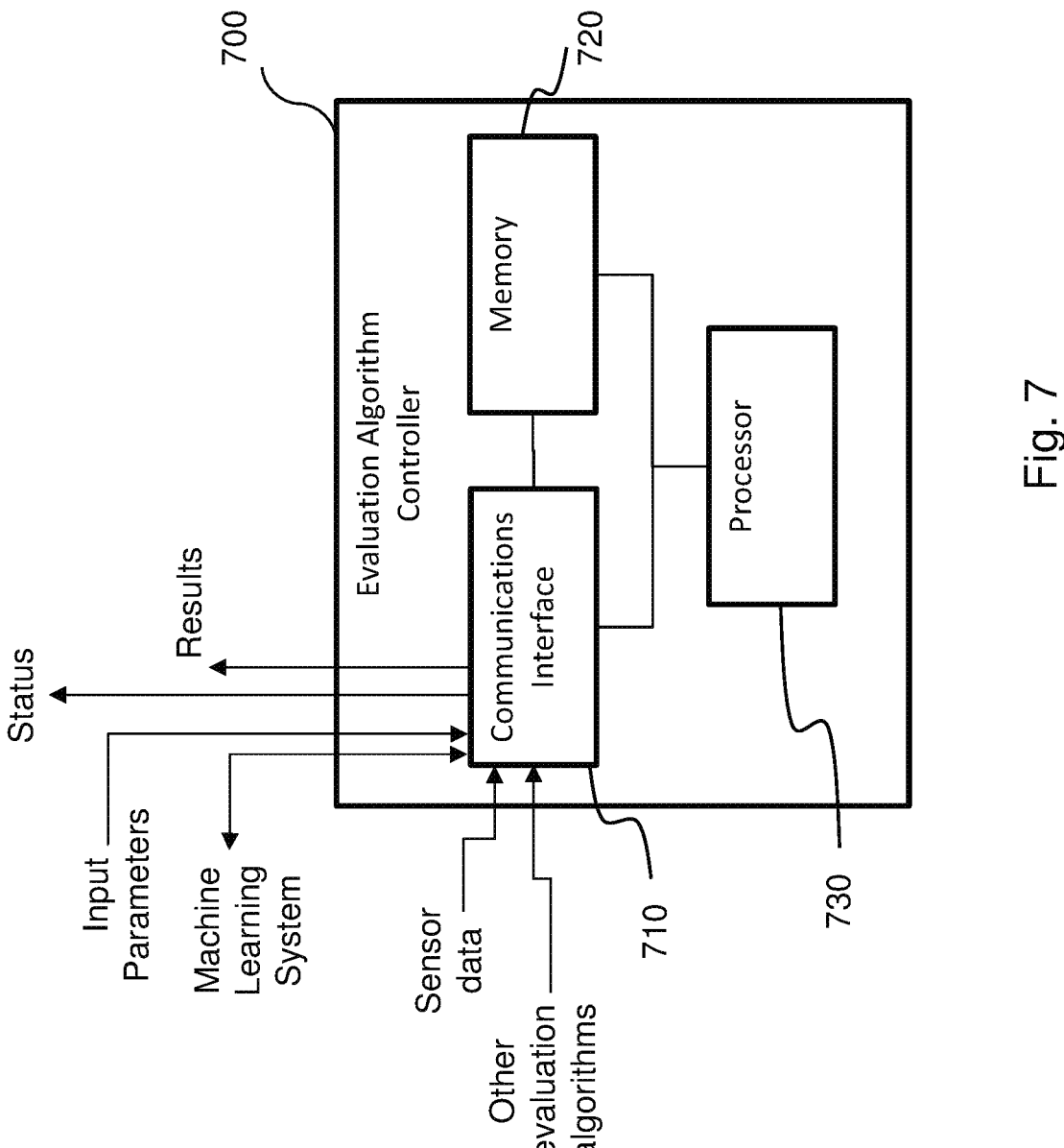
FIG. 7 is an illustration of a block diagram of an example of an acoustic data analyzer controller according to the principles of the disclosure.

Evaluation algorithm analyzer 620 (e.g., one or more analyzation processors such as processor 730 of FIG. 7) can implement the analysis and algorithms as described herein utilizing the sensor data, the input parameters, and other evaluation algorithms that have been made available for use at the current borehole system. For example, evaluation algorithm analyzer 620 can allow a user to define an evaluation algorithm using one or more sensor inputs and statistical analysis. Evaluation algorithm analyzer 620 can allow the evaluation algorithm to be reviewed by an SME to meet pertinent technical qualifications and a business user to identify appropriate distribution indicators allowing other users to utilize the defined evaluation algorithm at the same or different borehole system.

A memory or data storage of evaluation algorithm analyzer 620 can be configured to store the processes and algorithms for directing the operation of evaluation algorithm analyzer 620. Evaluation algorithm analyzer 620 can also include one or more processors that are configured to operate according to the analysis operations and algorithms disclosed herein, and an interface to communicate (transmit and receive) data.

FIG. 7 is an illustration of a block diagram of an example of an evaluation algorithm controller 700 according to the principles of the disclosure. Evaluation algorithm controller 700 can be stored on a single computer or multiple computers. The various components of evaluation algorithm controller 700 can communicate via wireless or wired conventional connections. A portion or a whole of evaluation algorithm controller 700 can be located at one or more locations and other portions of evaluation algorithm controller 700 can be located on a computing device or devices located at a surface location. In some aspects, evaluation algorithm controller 700 can be wholly located at a surface or distant location. In some aspects, evaluation algorithm controller 700 can be part of another system, and can be integrated into a single device, such as a part of a borehole operation system, a well site controller, or other borehole system.

Evaluation algorithm controller 700 can be configured to perform the various functions disclosed herein including receiving input parameters, sensor data, and other evaluation algorithms, and generating results from an execution of the methods and processes described herein, such as generating an evaluation algorithm and submitting it for SME and business approval. Evaluation algorithm controller 700 includes a communications interface 710, a memory 720, and a processor 730.

Communications interface 710 is configured to transmit and receive data. For example, communications interface 710 can receive the input parameters, sensor data, and other evaluation algorithms. Communications interface 710 can transmit the results, data from the input parameters, or interim outputs. In some aspects, communications interface 710 can transmit a status, such as a success or failure indicator of evaluation algorithm controller 700 regarding receiving the various inputs, transmitting the generated results, or producing the results.

In some aspects, communications interface 710 can receive input parameters from a machine learning system, for example, where the sensor data is processed using one or more filters and algorithms and the machine learning system uses prior learned analyzation models to improve the determination of the solid component parameters.

In some aspects, the machine learning system can be implemented by processor 730 and perform the operations as described by evaluation algorithm analyzer 620. Communications interface 710 can communicate via communication systems used in the industry. For example, wireless or wired protocols can be used. Communication interface 710 is capable of performing the operations as described for data transceiver 610 and result transceiver 630 of FIG. 6.

Memory 720 can be configured to store a series of operating instructions that direct the operation of processor 730 when initiated, including the code representing the algorithms for determining and processing the collected data. Memory 720 is a non-transitory computer-readable medium. Multiple types of memory can be used for data storage and memory 720 can be distributed.

Processor 730 can be configured to produce the results (e.g., generating the evaluation algorithm), one or more interim outputs, and statuses utilizing the received inputs. Processor 730 can be configured to direct the operation of evaluation algorithm controller 700. Processor 730 includes the logic to communicate with communications interface 710 and memory 720, and perform the functions described herein. Processor 730 is capable of performing or directing the operations as described by evaluation algorithm analyzer 620 of FIG. 6. Processor 730 can be one or more processors and be of one or more types of processors.

Various figures and descriptions can demonstrate a visual display of the acoustic data and the resulting analysis of the acoustic data. In some aspects, the visual display can be utilized by a user to determine the next steps of the analysis. In some aspects, the visual display does not need to be generated, and a system, such as a machine learning system, can perform the analysis using the received data. In some aspects, a visual display and a machine learning system can be utilized. In some aspects, the acoustic data or partially analyzed acoustic data can be transmitted to one or more surface computing systems, such as a well site controller, a computing system, or other processing system. The surface system or surface systems can perform the analysis and can communicate the results to one or more other systems, such as a well site controller, a well site operation planner, a geo-steering system, or another borehole system.

A portion of the above-described apparatus, systems or methods may be embodied in or performed by various analog or digital data processors, wherein the processors are programmed or store executable programs of sequences of software instructions to perform one or more of the steps of the methods. A processor may be, for example, a programmable logic device such as a programmable array logic (PAL), a generic array logic (GAL), a field programmable gate array (FPGA), or another type of computer processing device (CPD). The software instructions of such programs may represent algorithms and be encoded in machine-executable form on non-transitory digital data storage media, e.g., magnetic or optical disks, random-access memory (RAM), magnetic hard disks, flash memories, and/or read-only memory (ROM), to enable various types of digital data processors or computers to perform one, multiple or all of the steps of one or more of the above-described methods, or functions, systems or apparatuses described herein.

Portions of disclosed examples or embodiments may relate to computer storage products with a non-transitory computer-readable medium that has program code thereon for performing various computer-implemented operations that embody a part of an apparatus, device or carry out the steps of a method set forth herein. Non-transitory used herein refers to all computer-readable media except for transitory, propagating signals. Examples of non-transitory computer-readable media include, but are not limited to: magnetic media such as hard disks, floppy disks, and magnetic tape; optical media such as CD-ROM disks; magneto-optical media such as floppy disks; and hardware devices that are specially configured to store and execute program code, such as ROM and RAM devices. Configured or configured to means, for example, designed, constructed, or programmed, with the necessary logic and/or features for performing a task or tasks. Examples of program code include both machine code, such as produced by a compiler, and files containing higher-level code that may be executed by the computer using an interpreter.

In interpreting the disclosure, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

Those skilled in the art to which this application relates will appreciate that other and further additions, deletions, substitutions, and modifications may be made to the described embodiments. It is also to be understood that the terminology used herein is for the purpose of describing particular embodiments only, and is not intended to be limiting, since the scope of the present disclosure will be limited only by the claims. Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, a limited number of the exemplary methods and materials are described herein.

Each of the aspects disclosed in the SUMMARY can have one or more of the following additional elements in combination. Element 1: using the evaluation algorithm as stored in the data store at the industry system or at one or more other industry systems. Element 2: wherein the technical approval process is a SME or a DevOps pipeline. Element 3: wherein the communicating further comprises performing a business management review of the evaluation algorithm after the technical approval process is approved to determine a type of industry system permitted to utilize the evaluation algorithm and locations of the industry system permitted to utilize the evaluation algorithm. Element 4: wherein the business management review further includes a user access level for the evaluation algorithm. Element 5: where the business management review further includes an adjustment to the one or more alerts of the evaluation algorithm. Element 6: predicting equipment failure utilizing the evaluation algorithm. Element 7: mitigating the equipment failure using the predicting. Element 8: reducing a potential risk of an industry operation by using the evaluation algorithm at the industry system to monitor the industry operation. Element 9: wherein the one or more alarms or one or more alerts utilize a confidence level indicating a confidence of results from the evaluation algorithm. Element 10: wherein the defining and determining are performed on a well site controller, a surface controller, or a computing system. Element 11: wherein the method is performed on an evaluation algorithm analyzer or an evaluation algorithm controller. Element 12: wherein a machine learning system is utilized to perform the statistical analysis on the sensor parameters. Element 13: the machine learning system is accessed from the evaluation algorithm. Element 14: a result transceiver, capable of communicating results of the technical approval process. Element 15: wherein after the technical approval process is approved, the evaluation algorithm is forwarded to a business management review where a determination is made on types of industry systems that are permitted to use the evaluation algorithm. Element 16: where the data receiver is capable of communicating with the one or more data stores. Element 17: wherein the one or more processors is a well site controller, a borehole controller, a surface controller, or a computing system. Element 18: a machine learning system, capable of communicating with the one or more processors to analyze the sensor parameters and provide statistical analysis as part of a definition of the evaluation algorithm. Element 19: wherein the industry system is a borehole system for hydrocarbon production. Element 20: wherein the technical approval process is one or more of a SME or a DevOps pipeline. Element 21: directing a mitigation of the equipment failure using the predicting.

What is claimed is:

1. A method, comprising:
   collecting sensor parameters from one or more sensors or data stores, wherein the sensor parameters are associated with a borehole system;
   defining an evaluation algorithm, wherein the evaluation algorithm maps a relationship between at least one of one or more of the sensor parameters or one or more meta-data of the borehole system;
   updating the evaluation algorithm with results of a statistical analysis applied to the sensor parameters, wherein the statistical analysis is used to define a relationship between two or more of the sensor parameters, two or more of the meta data, or at least one sensor parameter and at least one meta data;

determining one or more alarms or one or more alerts for the evaluation algorithm using one or more threshold parameters, and packaging the one or more alarms or the one or more alerts with the evaluation algorithm, wherein the one or more threshold parameters are associated with one or more of the sensor parameters;

communicating the evaluation algorithm to a technical approval process; and storing the evaluation algorithm in a data store when the evaluation algorithm is approved by the technical approval process.

2. The method as recited in claim 1, further comprises: using the evaluation algorithm as stored in the data store at the industry system or at one or more other industry systems.

3. The method as recited in claim 1, wherein the technical approval process is a subject matter expert (SME) or a development operations (DevOps) pipeline.

4. The method as recited in claim 1, wherein the communicating further comprises:

performing a business management review of the evaluation algorithm after the technical approval process is approved to determine a type of industry system permitted to utilize the evaluation algorithm and locations of the industry system permitted to utilize the evaluation algorithm.

5. The method as recited in claim 4, wherein the business management review further includes a user access level for the evaluation algorithm.

6. The method as recited in claim 4, where the business management review further includes an adjustment to the one or more alerts of the evaluation algorithm.

7. The method as recited in claim 1, further comprises:

predicting equipment failure utilizing the evaluation algorithm; and mitigating the equipment failure using the predicting.

8. The method as recited in claim 1, further comprises:

reducing a potential risk of an industry operation by using the evaluation algorithm at the industry system to monitor the industry operation.

9. The method as recited in claim 1, wherein the one or more alarms or one or more alerts utilize a confidence level indicating a confidence of results from the evaluation algorithm.

10. The method as recited in claim 1, wherein the statistical analysis includes a reliability method to predict a reliability of the one or more sensor parameters.

11. The method as recited in claim 1, wherein the method is performed on an evaluation algorithm analyzer or an evaluation algorithm controller.

12. The method as recited in claim 1, wherein a machine learning system is utilized to perform the statistical analysis on the sensor parameters, and the machine learning system is accessed from the evaluation algorithm.

13. A system, comprising:

one or more sensors located proximate to a borehole system, wherein the one or more sensors collect sensor parameters;

a data receiver, capable to receive the sensor parameters, input parameters, and one or more approved evaluation algorithms;

one or more processors, capable to communicate with the data receiver, and to provide an interface for a user to define an evaluation algorithm, and forward the evaluation algorithm to a technical approval process for a technical review, wherein the evaluation algorithm is defined by mapping a relationship between at least one of one or more of the sensor parameters or one or more meta-data of the borehole system, wherein one or more threshold parameters are associated with one or more of the sensor parameters, and the evaluation algorithm is updated with results of a statistical analysis used to define a relationship between two or more of the sensor parameters, two or more of the meta data, or at least one sensor parameter and at least one meta data; and one or more data stores, capable of storing the evaluation algorithm as received from the one or more processors, and communicating with equipment at one or more borehole systems, wherein the evaluation algorithm is used at the one or more borehole systems.

14. The system as recited in claim 13, further comprises:

a result transceiver, capable of communicating results of the technical approval process.

15. The system as recited in claim 13, wherein after the technical approval process is approved, the evaluation algorithm is forwarded to a business management review where a determination is made on types of industry systems that are permitted to use the evaluation algorithm.

16. The system as recited in claim 13, where the data receiver is capable of communicating with the one or more data stores.

17. The system as recited in claim 13, wherein the one or more processors is a well site controller, a borehole controller, a surface controller, or a computing system.

18. The system as recited in claim 13, further comprises:

a machine learning system, capable of communicating with the one or more processors to analyze the sensor parameters and provide statistical analysis as part of a definition of the evaluation algorithm.

19. The system as recited in claim 13, wherein the borehole system is for hydrocarbon production.

20. The system as recited in claim 13, wherein the technical approval process is one or more of a subject matter expert (SME) or a development operations (DevOps) pipeline.

21. A computer program product having a series of operating instructions that directs a processor, when executed thereby to perform operations, the operations comprising:

collecting sensor parameters from one or more sensors or data stores, wherein the sensor parameters are associated with a borehole system;

defining an evaluation algorithm, wherein the evaluation algorithm maps a relationship between at least one of one or more of the sensor parameters or one or more meta-data of the borehole system;

updating the evaluation algorithm with results of a statistical analysis applied to the sensor parameters, wherein the statistical analysis is used to define a relationship between two or more of the sensor parameters, two or more of the meta data, or at least one sensor parameter and at least one meta data;

determining one or more alarms or one or more alerts for the evaluation algorithm using one or more threshold parameters, and packaging the one or more alarms or the one or more alerts with the evaluation algorithm, wherein the one or more threshold parameters are associated with one or more of the sensor parameters;

communicating the evaluation algorithm to a technical approval process; and storing the evaluation algorithm in a data store when the evaluation algorithm is approved by the technical approval process.

22. The computer program product as recited in claim 21, wherein the communicating further comprises:

performing a business management review of the evaluation algorithm after the technical approval process is approved to determine types of industry systems permitted to utilize the evaluation algorithm and locations of the industry systems permitted to utilize the evaluation algorithm.

23. The computer program product as recited in claim 21, further comprises:

predicting equipment failure utilizing the evaluation algorithm; and directing a mitigation of the equipment failure using the predicting.

* * * * *